US012619516B2

(12) United States Patent
Hawker

(10) Patent No.: US 12,619,516 B2
(45) Date of Patent: May 5, 2026

(54) AUTOMATED CODE SCANNING FOR PRE-EMPTIVE ISSUE DETECTION AND RESOLUTION

(71) Applicant: Microsoft Technology Licensing, LLC, Redmond, WA (US)

(72) Inventor: Michael Andrew Hawker, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 18/336,152

(22) Filed: Jun. 16, 2023

(65) Prior Publication Data

US 2024/0419575 A1     Dec. 19, 2024

(51) Int. Cl.
G06F 11/3604 (2025.01)
G06F 8/35 (2018.01)

(52) U.S. Cl.
CPC ............ G06F 11/3608 (2013.01); G06F 8/35 (2013.01)

(58) Field of Classification Search
CPC .................................................. G06F 11/3608
See application file for complete search history.

(56) References Cited

U.S. PATENT DOCUMENTS

| | | | | |
|---|---|---|---|---|
| 8,479,161 | B2 * | 7/2013 | Weigert | ..................... G06F 8/75 |
| | | | | 717/124 |
| 8,495,100 | B2 | 7/2013 | Cheung | |
| 8,635,204 | B1 * | 1/2014 | Xie | ........................... G06F 8/71 |
| | | | | 707/E17.075 |
| 8,713,554 | B1 | 4/2014 | Chopra et al. | |
| 9,430,359 | B1 * | 8/2016 | Troutman | ........... G06F 11/0793 |
| 10,162,740 | B1 * | 12/2018 | Setty | ................... G06F 9/44505 |
| 10,481,879 | B2 | 11/2019 | Stevens et al. | |
| 10,503,478 | B2 * | 12/2019 | Maurya | ..................... G06F 8/20 |
| 10,628,577 | B2 | 4/2020 | Koohgoli et al. | |
| 10,740,216 | B1 * | 8/2020 | Parent | .................... G06N 20/00 |
| 10,831,635 | B2 * | 11/2020 | Hardee | ..................... G06F 8/43 |
| 11,086,619 | B2 * | 8/2021 | Sharma | ..................... G06F 8/77 |
| 11,237,824 | B2 | 2/2022 | Masis et al. | |
| 11,474,816 | B2 * | 10/2022 | Hicks | .................... G06Q 30/04 |
| 11,604,642 | B2 * | 3/2023 | Jayapandy | .............. G06N 5/04 |

(Continued)

FOREIGN PATENT DOCUMENTS

| | | | | |
|---|---|---|---|---|
| CA | 3078935 C | * | 8/2023 | .............. G06F 8/60 |
| EP | 3441875 A1 | | 2/2019 | |

OTHER PUBLICATIONS

Mahajan, Sonal, Negarsadat Abolhassani, and Mukul R. Prasad. "Recommending stack overflow posts for fixing runtime exceptions using failure scenario matching." Proceedings of the 28th ACM Joint Meeting on European Software Engineering Conference and Symposium on the Foundations of Software Engineering. 2020.*

(Continued)

*Primary Examiner* — Francisco J Aponte

(57) ABSTRACT

An issue source scanning system scans a source of information about an issue to identify characteristics of code which indicate that the issue will manifest in code. A code scanning system scans code to match the identified characteristics against the code to determine whether the source code includes the identified characteristics. The code scanning system automatically generates a suggested operation to perform based upon a match between the identified characteristic and the code.

20 Claims, 7 Drawing Sheets

(56) References Cited

U.S. PATENT DOCUMENTS

| | | | | |
|---|---|---|---|---|
| 11,775,895 | B2* | 10/2023 | Bar-On | G06F 8/20 |
| | | | | 717/103 |
| 11,947,933 | B2* | 4/2024 | Todirel | G06F 11/1471 |
| 12,039,471 | B2* | 7/2024 | Gardini Vedovatto | |
| | | | | H04W 24/02 |
| 12,105,582 | B2* | 10/2024 | Arumugam | G06F 11/0769 |
| 2006/0184927 | A1 | 8/2006 | Deblaquiere et al. | |
| 2011/0321007 | A1* | 12/2011 | Marum | G06F 8/65 |
| | | | | 717/124 |
| 2017/0004065 | A1* | 1/2017 | Angwin | G06F 11/34 |
| 2017/0053289 | A1* | 2/2017 | Wang | G05B 23/0278 |
| 2017/0083428 | A1* | 3/2017 | Champlin-Scharff | |
| | | | | G06F 11/3698 |
| 2017/0212829 | A1 | 7/2017 | Bales | |
| 2018/0089572 | A1* | 3/2018 | Aili | G06F 9/453 |
| 2018/0101465 | A1* | 4/2018 | Keinan | G06F 11/3604 |
| 2018/0107583 | A1* | 4/2018 | Champlin-Scharff | |
| | | | | G06F 9/451 |
| 2018/0307904 | A1* | 10/2018 | Patil | G06F 40/30 |
| 2019/0026106 | A1* | 1/2019 | Burton | G06F 8/71 |
| 2020/0159525 | A1 | 5/2020 | Bhalla | |
| 2020/0183818 | A1* | 6/2020 | Guenther | G06F 11/3604 |
| 2020/0210158 | A1* | 7/2020 | Bucuvalas | G06F 8/75 |
| 2020/0364042 | A1* | 11/2020 | Wuensche | G06F 8/77 |
| 2021/0019142 | A1* | 1/2021 | Bhagwan | G06F 8/427 |
| 2021/0089299 | A1* | 3/2021 | Gupta | G06F 8/72 |
| 2021/0117308 | A1* | 4/2021 | Burgos | G06N 20/00 |
| 2021/0126949 | A1* | 4/2021 | Nadgowda | H04L 63/1433 |
| 2021/0141640 | A1 | 5/2021 | Turner | |
| 2021/0263728 | A1* | 8/2021 | Farrier | G06F 17/18 |
| 2021/0406152 | A1 | 12/2021 | Quemy | |
| 2022/0156053 | A1* | 5/2022 | Shaastry | G06F 8/433 |
| 2022/0164182 | A1* | 5/2022 | Hicks | G06Q 30/04 |
| 2022/0385535 | A1* | 12/2022 | Verma | G06F 8/61 |
| 2023/0141524 | A1* | 5/2023 | Giles | G06F 8/71 |
| | | | | 717/121 |
| 2024/0385942 | A1* | 11/2024 | Hawker | G06F 11/0793 |
| 2025/0028626 | A1 | 1/2025 | Lawler | |
| 2025/0060962 | A1* | 2/2025 | Tornhill | G06F 8/77 |

OTHER PUBLICATIONS

International Search Report and Written Opinion received for PCT Application No. PCT/US2024/033476, Sep. 5, 2024, 18 pages.
International Search Report and Written Opinion received for PCT Application No. PCT/US2024/028095, Jul. 24, 2024, 13 pages.
"About Code Scanning". Retrieved From: https://docs.github.com/en/code-security/code-scanning/automatically-scanning-your-code-for-vulnerabilities-and-errors/about-code-scanning. Retrieved From: May 3, 2023, 3 Pages.
"Issue Tracking System", Retrieved From: https://en.wikipedia.org/wiki/Issue_track ng_sys em, Aug. 23, 2022, 4 Pages.
"Working With Dependabof", Retrieved From: https://docs.github.com/en/code-security/dependabot/working-with-dependabot. Retrieved From: May 3, 2023, 2 Pages.
Ma, et al., "How do Developers Fix Cross-project Correlated Bugs?", In Proceedings of IEEE/ACM 39th International Conference on Software Engineering, May 2017, pp. 381-392.
"Overview of source code analysis", https://leam.microsoft.com/en-us/visualstudio/code-quality/roslyn-analyzers-overview?view=vs-2022, Mar. 9, 2023, 5 pages.
"Tutorial: Write your first analyzer and code fix", Retrieved from: https://learn.microsoft.com/en-us/dotnet/csharp/roslyn-sdk/tutorials/how-to-write-csharp-analyzer-code-fix: Feb. 4, 2022, 25 pages.
Retrived from: dotnet/src/CommunityToolkit.Mvvm.CodeFixers at main • Community Toolkit/dotnet • GitHub, Jun. 2023, 11 pages.
Non-Final Office Action mailed on Nov. 6, 2024, in U.S. Appl. No. 18/317,530, 31 pages.
Final Office Action mailed on May 13, 2025, in U.S. Appl. No. 18/317,530, 31 pages.
Non-Final Office Action mailed on Aug. 27, 2025, in U.S. Appl. No. 18/317,530, 29 pages.
International Preliminary Report on Patentability (Chapter I) received for PCT Application No. PCT/US2024/028095, Mailed on Nov. 27, 2025, 08 Pages.
International Preliminary Report on Patentability (Chapter I) received for PCT Application No. PCT/US2024/033476, mailed on Dec. 26, 2025, 12 pages.
Final Office Action mailed on Feb. 12, 2026, in U.S. Appl. No. 18/317,530, 32 pages.

* cited by examiner

AUTOMATED CODE SCANNING FOR PRE-EMPTIVE ISSUE DETECTION AND RESOLUTION

BACKGROUND

Computing systems are currently in wide use. Some computing systems host or distribute applications that are accessed by end users. The hosted or distributed applications may provide a wide variety of different functionality.

Some such applications are generated using a continuous integration system in which multiple developers can collaborate in generating human readable code that is stored in a shared code base or code repository. Version control is used to resolve editing conflicts among the various developers, and build automation is used to create a machine runnable snapshot of a version of the code. That snapshot can then be distributed to end users through any of a variety of different networks. For instance, when the application is a web-based application, the snapshot created during the build process may be copied to a website where it can be accessed by users. When the application is a mobile application, then the snapshot created during the build process may be copied to a location where it can be downloaded by a user to a mobile device.

The discussion above is merely provided for general background information and is not intended to be used as an aid in determining the scope of the claimed subject matter.

SUMMARY

An issue scanning system scans a source of information about an issue to identify characteristics of code which indicate that the issue will manifest in code. A code scanning system examines code to match the identified characteristics against the code to determine whether the source code includes the identified characteristics. A suggestion generator automatically generates a suggested operation to perform based upon a match between the identified characteristic and the code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
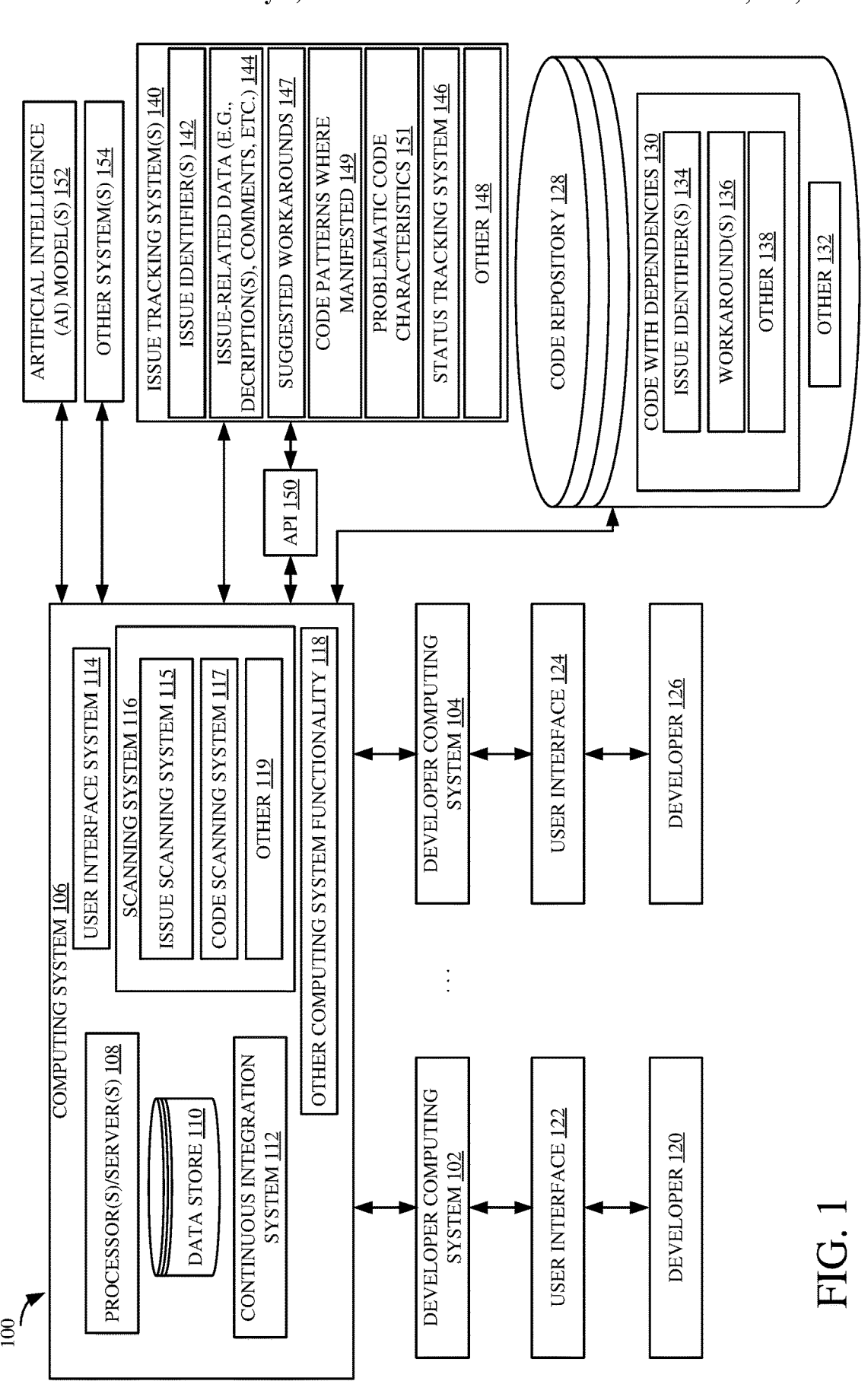
FIG. 1 is a block diagram of one example of a computing system architecture.

As discussed above, some computing systems use continuous integration (CI) systems to allow a plurality of different developers to collaborate on a code base that is stored in a code repository. Some portions of the code in the code base may depend on other code, and these portions of other code may thus be referred to as dependent code (or dependencies). It is common that, while writing code, a developer must workaround a known issue within the dependent code. By "issue" it is meant, for example, that a piece of code is malfunctioning, crashing, or behaving in an undesired way and the malfunction, crash, or undesired behavior is caused by dependent code. In order to restore correct behavior, the developer may write extra code to work-around the malfunction, crash, or undesired behavior caused by the dependent code. The extra code is called a workaround.

Information about issues may be stored in a variety of different types of issue tracking systems. For instance, an issue tracking system may be a developer's own issue tracking system, an issue tracking system that is maintained by a developer's team, an issue tracking system corresponding to a dependency (or dependent code), or another issue tracking system. Some issue tracking systems are accessible by a wide variety of different developers so that those developers can provide comments, suggested workarounds, information about where and under what circumstances the issue manifests itself, a version identifier for a dependency in which the issue arises, and other information. For instance, some developers may provide comments in an issue tracking system. The comments may identify the code, in their code base, which caused an issue in a dependency to manifest itself. Other information in an issue tracking system may identify problematic characteristics of code which may cause an issue to manifest itself in other ways.

It is often very difficult for a developer to know when a dependency will cause an issue to manifest itself in code. Sometimes, issues are specific to certain features or versions of the dependent code, and it is not always known to a developer using that external dependency that performing an operation calling the dependency could lead to the manifestation of potential issues under certain circumstances, or if the currently working code may break (e.g., cause an issue to manifest itself) when upgrading to a newer version of the dependency.

The present discussion thus proceeds with respect to a system that preemptively scans information describing an issue with dependent code. The information describing the issue may be stored in one or more issue tracking systems or elsewhere. In scanning the information, the present system identifies patterns and problems with specific versions of the dependent code. Specifically, the system identifies problematic code characteristics which, if implemented in code, cause the issue to manifest itself in that code. The present system then scans code in a code base to determine whether the code in the code base includes the problematic code characteristics. If so, this indicates that, if the code in the code base calls the dependent code, the issue will manifest itself when running the code in the code base. The present system generates a user interface display preemptively identifying potential and unknown issues in the code base or potential issues which may manifest themselves when changing to a different version of the dependent code (e.g., upgrading or downgrading). The present system can also trigger various actions, such as surfacing the information describing the issue from the issue tracking system, surfacing suggested or potential workarounds for the issue, surfacing a list of locations within the code base where the issue may manifest itself, and/or surfacing selectable, automated operations which can be automatically performed to preemptively address the issue. By preemptive, it is meant, in one example, that an action is taken before the issue manifests itself in the code, etc.

FIG. 1 is a block diagram showing one example of a computing system architecture 100. In architecture 100, a plurality of developer computing systems 102-104 have access to computing system 106 which includes one or more processors or servers 108, data store 110, continuous integration system 112, user interface system 114, scanning system 116 (which can include issue scanning system 115, code scanning system 117, and other items 119), and other computing system functionality 118. FIG. 1 shows that developer 120 has access to developer computing system 102 through user interface 122. Developer 120 can interact with user interface 122 in order to control and manipulate developer computing system 102 and parts of computing system 106. Also, developer computing system 104 generates user interface 124 for interaction by developer 126. Developer 126 can interact with user interface 124 in order to control and manipulate developer computing system 104 and some parts of computing system 106.

In the example shown in FIG. 1, computing system architecture 100 also includes code repository 128 that may include code 130 that has external dependencies, and other items 132. Code 130 can include, in addition to the code, issue identifiers 134, workarounds 136, and other items 138. By way of example, issue identifiers 134 identify issues that have manifested themselves in code 130 when code 130 invokes a dependency. A workaround 136 may also have been implemented to address the issue. The issue identifiers 134 identify the issue within an issue tracking system 140. Also, issue tracking system 140 may include issue records describing issues with dependent code (dependencies), where the issues are not identified in code repository 128 or have not yet manifested themselves in code 130. For instance, the issue tracking system 140 may correspond to a version of the dependent code that is not being referred to in code 130, or the issue may be an issue that is not identified in code 130 for other reasons.

Issue tracking system 140 may index different issue records by issue identifiers 142 that identify the issues. The issue records may include issue-related data 144 which may, itself, include user comments, and other information describing the issue. The issue records can include information describing potential workarounds 147 for the issue, information indicative of code patterns 149 where the issue manifests itself, and other problematic code characteristics 151 which identify characteristics of code 130 in code repository 128 that, if present, may cause the issue to manifest itself when running code 130. It should be noted the code patterns 149 can include both positive code patterns (that indicate patterns in code 130—such as the presence of a workaround that is no longer needed) as well as negative code patterns (such as an indication that a workaround is needed but is not found in code 130). These are just some examples of problematic code characteristics.

Issue tracking system 140 may also include a status tracking system 146 that tracks the status of each of the issues and allows external systems to identify the status for each of the issues. By way of example, the status of an issue may indicate that the issue still exists, that the issue has been resolved, that the issue will not be resolved, etc. Issue tracking system 140 may include other items 148 as well. In the example shown in FIG. 1, issue tracking system 140 may expose an application programming interface (API) 150 for access by other systems, such as computing system 106.

FIG. 1 also shows that computing system architecture 100 may include, or have access to, artificial intelligence (AI) models 152 and any of a wide variety of other systems 154.

In one example, developer computing systems 102-104 allow developers 120, 126 to collaborate on the code 130 in code repository 128 using continuous integration system 112. Therefore, continuous integration system 112 may have version control functionality, automated testing functionality, build functionality, code deployment functionality, and any of a wide variety of other systems or functional components that allow developers 120, 126 to collaborate on and deploy code 130. Also, continuous integration system 112 allows developers 120, 126, when they are developing or maintaining code, to insert issue identifiers 134 that identify issues for which a workaround 136 is needed. The issue identifiers 134 may be uniform resource locators (URLs) that can be navigated in order to access an issue record in issue tracking system 140 that describes the issue. The issue record may also identify the status of the issue. Further, the issue identifiers 134 may include a website or webpage, or another issue identifier that identifies the issue within an issue tracking system 140.

Developers 120, 126 or other users may also have access to issue tracking system 140 where they can create or add to an entry or issue record for each issue and provide the issue identifier 142 and issue-related data 144 which describes the issue. Developers 120, 126 can also actuate scanning system 116 to initiate a scan of issue tracking system(s) 140 to preemptively identify problematic code characteristics which, if present in code 130, may cause the corresponding issue to manifest itself when code 130 is executed. Issue tracking system 140 may also allow developers or other users to provide comments or issue descriptions or other issue-related data 144. The issue records may include suggested workarounds 147 that can be used to address the issue, and code patterns 149 that identify patterns in code 130 which, if present in code 130, may cause the issue to manifest when running code 130. The issue records may also identify other problematic code characteristics 151, such as discussions or other information indicating that prior workarounds are no longer needed, or other problematic code characteristics. Other problematic code characteristics 151 indicate other particular characteristics of code 130 which, if present, may cause the issue to manifest when running code 130. Such characteristics may be identified by an AI model 152 processing the data in issue tracking system 140, specified by a user or developer, or generated in other ways. Developers 120, 126 can access and/or add a wide variety of other data. It will also be noted that there may be more than one issue tracking system 140 that each track different issues in code 130 or its dependencies. Therefore, in one example, an issue identifier 134 will also identify the particular issue tracking system that is tracking the status of the issue identified by issue identifier 134.

When an issue is resolved, the developer or other person that is responsible or accountable to the issue may update the issue-related data 144 and the status of the issue in status tracking system 146 to indicate that the issue is resolved.

In one example, code scanning system 117 uses user interface system 114 to generate information indicative of a user interface that displays the issue, information about the issue, and other information to the relevant developer (for the purposes of the present discussion it will be assumed that developer 120 is the relevant developer). In another example, scanning system 116 can use AI models 152 or other logic to identify suggested operations that developer 120 might perform to preemptively address the issue, when a determination that the problematic code characteristics are found in code 130. For instance, code scanning system 116 can extract the issue-related data 144, suggested work-arounds 147, code patterns 149 (e.g., both positive and negative code patterns), code characteristics 151, and/or other information, and generate an AI prompt, based upon that data, to AI models 152. Scanning system 116 can receive a response from AI models 152 where the response may identify the suggested operations, or other information that can be surfaced for developer 120.

One specific type of AI model is referred to as a large language model (LLM). An LLM is language model that includes a large number of parameters (often tens of billions or hundreds of billions of parameters). An LLM is often referred to as a generative AI model in that it receives, as an input, a prompt which may include data, and an instruction to generate a particular output. For instance, for such models a generative AI model may be asked to generate a suggested workaround, or generate a set of problematic code charac-teristics which, when present, cause an issue to manifest. Other types of AI models perform classification. For instance, for such models a prompt may be generated that inputs data that is to be classified into one of a plurality of different categories. The AI model generates an output identifying the classification for the input. Other AI models can include multimodal generative AI models. Such multi-modal AI models may take different kinds of inputs (such as images and text) to infer an output. By taking images and text as an input the model may be able to process such things as screenshots of code, images of user interfaces, etc. These and other AI models can be used.

Also, it may be that a developer is unaware of any issues that may affect his or her code 130. For instance, there may be no issue that currently exists with respect to a depen-dency. However, it may be that a developer is about to upgrade to a newer version of the dependency, and unknown to the developer, the newer version of the dependency may cause an issue to manifest in code 130. Therefore, in one example, issue scanning system 115 scans information in issue tracking system 140 to identify code patterns or other characteristics of the developer's code which may cause an issue in the dependent code to manifest. By way of example, source scanning system 115 may extract the issue identifiers 142, issue-related data 144, suggested workarounds 147, code patterns 149, or other problematic code characteristics 151 or other data 148 and provide that information as a prompt to AI models 152. AI models 152 may analyze the data in the prompt and identify different problematic code characteristics which, if present in code 130, may cause an issue to manifest. Code scanning system 117 can then scan code 130 to determine whether any of those problematic code characteristics or code patterns exist in code 130.

If so, code scanning system 117 may generate an output for a developer identifying the locations in code 130 where the issue may manifest, the issue itself, as well as suggested workarounds or other information corresponding to the issue which may manifest if the developer takes a particular action. In another example, code scanning system 117 generates an output to the developer indicating operations that the developer may execute in order to preemptively avoid the issue, suggested workarounds that the developer may implement in order to address the issue, or automated operations which may be performed (such as automatically implementing a suggested workaround, etc.) in order to address the issue so that the issue does not manifest when users run code 130. Further, scanning system 116 may be intermittently triggered to scan issue tracking systems 140 as well as code 130 and/or other sources of information about issues. Some of the triggers are described in greater detail elsewhere herein.

Figure 2:
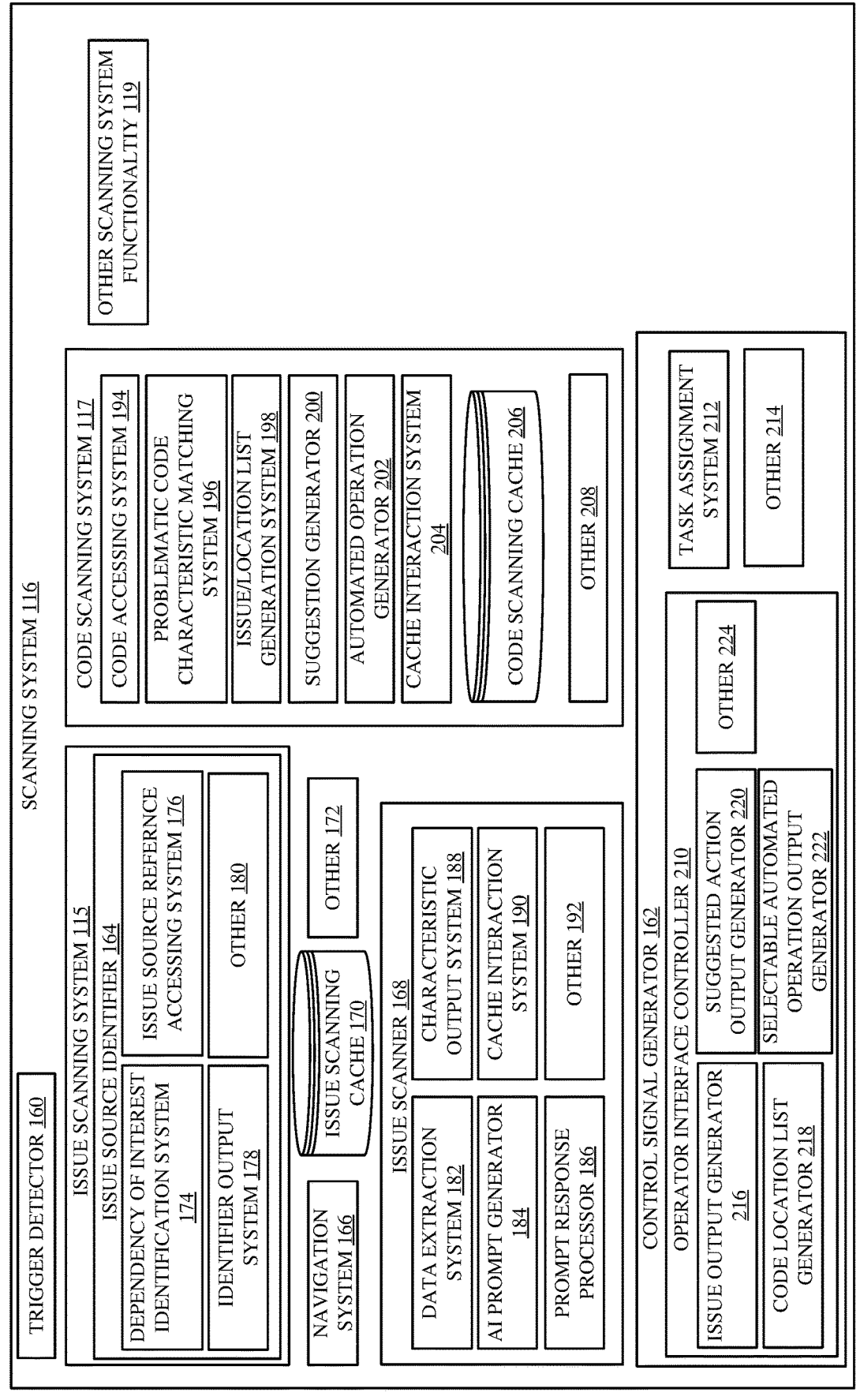
FIG. 2 is a block diagram of one example of a scanning system.

FIG. 2 is a block diagram showing one example of scanning system 116 in more detail. FIG. 2 shows that, in one example, scanning system 116 includes trigger detector 160, issue scanning system 115, code scanning system 117, control signal generator 162, and any of a wide variety of other scanning system functionality 119. Also, in the example shown in FIG. 2, issue scanning system 115 includes issue source identifier 164, navigation system 166, issue scanner 168, issue scanning cache 170, and other items 172. Issue source identifier 164 includes dependency-of-interest identification system 174, issue source reference accessing system 176, identifier output system 178, and other items 180. Issue source scanner 168 includes data extraction system 182, AI prompt generator 184, prompt response processor 186, characteristic output system 188, cache interaction system 190, and other items 192.

Also, in FIG. 2, code scanning system 117 includes code accessing system 194, problematic code characteristic matching system 196, issue/location list generation system 198, suggestion generator 200, automated operation genera-tor 202, cache interaction system 204, code scanning cache 206, and other items 208. Also, in the example shown in FIG. 2, control signal generator 162 includes operator inter-face controller 210, task assignment system 212, and other items 214. Operator interface controller 210 includes issue output generator 216, code location list generator 218, suggested action output generator 220, selectable automated output generator 222, and other items 224. Before describing the operation of scanning system 116 in more detail, a description of some of the items in system 116, and their operation, will first be provided.

Trigger detector 160 detects trigger criteria indicating that scanning system 116 is to scan one or more issue tracking systems 140 and/or other sources of information to look for any issues which may present problems with respect to dependencies of code 130. The trigger criteria may be time-based criteria so that trigger detector 160 detects a scanning trigger intermittently, based on time. The trigger criteria can be based on developer inputs so that developers 120, 126 or other users can request scanning system 116 to scan the issue tracking system(s) 140 and/or other sources of information about issues. The trigger criteria may include operation-based criteria which will trigger scanning system 116 based upon an operation, such as opening a file, gen-erating a build, etc. The trigger can be any of a wide variety of other trigger criteria as well.

Once triggered, issue scanning system 115 identifies and scans the sources of information about issues (such as issue tracking system 140) to identify code patterns or other characteristics which may be present in code being devel-oped (e.g., characteristics which may be present in code 130) that may cause an issue to manifest when running code 130. Accordingly, issue source identifier 164 identifies the sources of information about issues which are to be scanned. Dependency of interest identification system 174 identifies a dependency of interest as a dependency which is being relied upon by code 130. The dependency of interest may also be a dependency for which a developer is about to upgrade to a newer version of the dependency, or which the user is planning to incorporate into code 130, or use in other ways. The various dependencies of interest are then pro-vided to issue source reference accessing system 176 which identifies references to issue tracking system(s) 140 or other sources of information about issues corresponding to each dependency of interest, so the sources of information can be accessed and scanned. Identifier output system 178 outputs the identifiers (which may be URLs, website addresses, or other location identifiers that identify where information about issues can be accessed). Navigation system 166 then navigates to those locations (e.g., to issue tracking system 140) or calls APIs 150 that are exposed by the issue tracking systems or otherwise gains access to the information about issues which may manifest if a dependency of interest is used by code 130.

Issue scanner 168 then scans the information in the sources of information to identify code characteristics which, if present in code 130, may cause the issues to be manifested if the corresponding dependencies of interest are used by code 130. Data extraction system 182 extracts the various data in the issue records of issue tracking system 140 (such as data 144, code workarounds 147, code patterns 149, problematic code characteristics 151, etc.). AI prompt generator 184 generates a prompt configured for AI models 152 based upon the extracted data and provides that prompt to AI models 152. Prompt response processor 186 processes a response received from AI models 152 to identify the particular code patterns or characteristics or other information which, if it exists in code 130, will cause the corresponding issue to manifest in code 130. Characteristic output system 188 outputs that information (e.g., the code patterns, code characteristics) to code scanning system 117. Cache interaction system 190 stores the result of scanning the issue tracking system(s) 140 or other sources of information in issue scanning cache 170. The entries in issue scanning cache 170 may have a time indicator that indicates the time that the information in cache 170 was generated and/or the particular issue tracking system(s) 140 or other sources of information from which the results were generated, among other things.

Code accessing system 194 then accesses code 130 within code repository 128 and problematic code characteristic matching system 196 attempts to match the code patterns or other problematic code characteristics against code patterns and other characteristics of code 130 to see whether any of the code patterns or problematic code characteristics are in code 130. If so, issue/location list generation system 198 adds the location where those code patterns or characteristics reside in code 130 (along with the particular issue which will likely manifest because of those code patterns or characteristics) to a list. Suggestion generator 200 may then generate an output indicative of suggested operations that can be performed in code 130 in order to preemptively address the issue so that it does not manifest.

In one example, suggestion generator 200 can generate an output to control signal generator 162 which can surface the locations where the characteristics or code patterns exist in code 130, the issue which may manifest, as well as a suggested workaround 147 that may be implemented in code 130 to preemptively address the issue. In other example, suggestion generator 200 can generate a prompt to AI models 152 for a response indicative of possible suggestions which can be surfaced for the developer. The prompt, for instance, may include a description of the issue or other information corresponding to the issue, whether any workarounds 147 are available, the characteristics or code patterns in code 130 which will likely cause the issue to manifest, etc. The response from the AI models 152 may identify certain operations that should be performed given the AI prompt. Those operations may be, for instance, to incorporate or remove a workaround 147, to modify a workaround 147 and then incorporate the modified workaround, to update code 130 in other ways, to refrain from incorporating a different version of the dependency which contains the issue, to update other local or external systems, etc.

Suggestion generator 200 can generate an output indicative of all the suggested operations, and suggested automated operation generator 202 can generate an output indicative of which of those suggested operations can be performed automatically. The outputs from generators 200 and/or 202 can be provided to control signal generator 162. Control signal generator 162 can generate action signals to control different systems and subsystems based upon the outputs from suggestion generator 200, automated operation generator 202, and/or other items in code scanning system 117 and/or issue scanning system 115. Cache interaction system 204 controls code scanning cache 206 to maintain records indicative of the results generated by code scanning system 117, along with information identifying the time and sources from which those results were generated. Thus, caches 170 and 206 can be accessed prior to performing scanning operations to determine whether scanning operations have been recently performed and need not be repeated.

Operator interface controller 210 generates action signals that can be used to cause the display of certain information to a developer (e.g., developer 120), or to output or surface that information for use by developer 120 in other ways. For instance, issue output generator 216 generates an output identifying the issues that may manifest given the current configuration (code patterns, characteristics, etc.) of code 130. Code location list generator 218, for instance, can generate action signals indicative of the list of issues, the status of those issues, descriptions of the issues, etc. List generator 218 can include other information as well, such as the various locations in code 130 where the different issues may be manifested, so that developer 120 can quickly locate those locations in code 130 to address the issues, preemptively, so that they do not manifest when code 130 is run.

Suggested action output generator 220 generates signals that can be used to display to developer 120 the suggested operations or actions that are to be performed given the issues which may manifest in code 130 to preemptively stop those issues from manifesting. Those operations or actions may be, for instance, to implement workarounds 147, to modify workarounds and implement the modified workarounds, to delete a workaround that is no longer needed, or to modify code 130 in other ways, etc. The operations or actions may also be to incorporate a different version of the dependency which does not include the issue, to refrain from upgrading to a newer version or downgrading to an older version of the dependency, or any of a wide variety of other actions.

Selectable automated operation output generator 222 generates action signals that can be used to display to developer 120 a set of selectable, automated operations that can be selected by developer 120, and automatically performed. Those actions can be the same as the suggested actions or operations output by generator 220, or different actions or operations.

Task assignment system 212 can generate signals to interact with a scheduling system or a workload management system or other system to generate or modify a record identifying the issue, the location in code 130 where the issue may be manifested, the code patterns and/or other code characteristics of code 130 which may cause the issue to manifest, and any suggested operations that are to be performed in order to address the issue. In this way, the record in the scheduling or workload management system can be assigned to a particular user or group of users for resolution. In another example, a flag may be set in the issue tracking system 140 that is following this issue to indicate to, or alert, a person or group of people that the issue should be addressed in code 130. By way of example, the scheduling or workaround management system may surface the issues to a manager or other developer who can assign those issues to different people. Those people can then access the issue to see the suggested operations that may be performed, the selectable automated operations that may be performed, etc., and then preemptively resolve those issues accordingly.

Figure 3A:
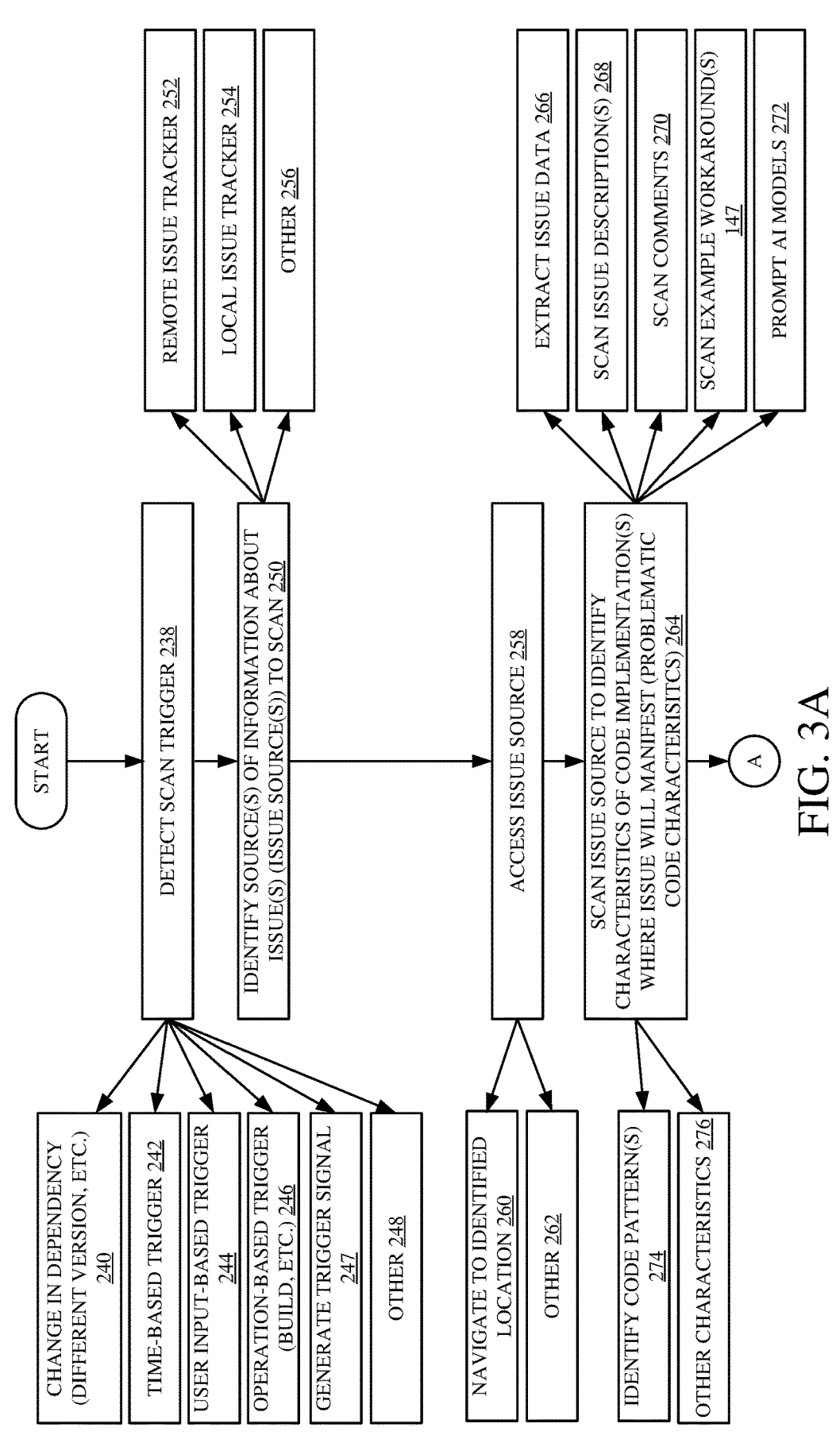
FIGS. 3A and 3B (collectively referred to herein as FIG. 3) show a flow diagram illustrating one example of the operation of a code scanning system.
Figure 3B:
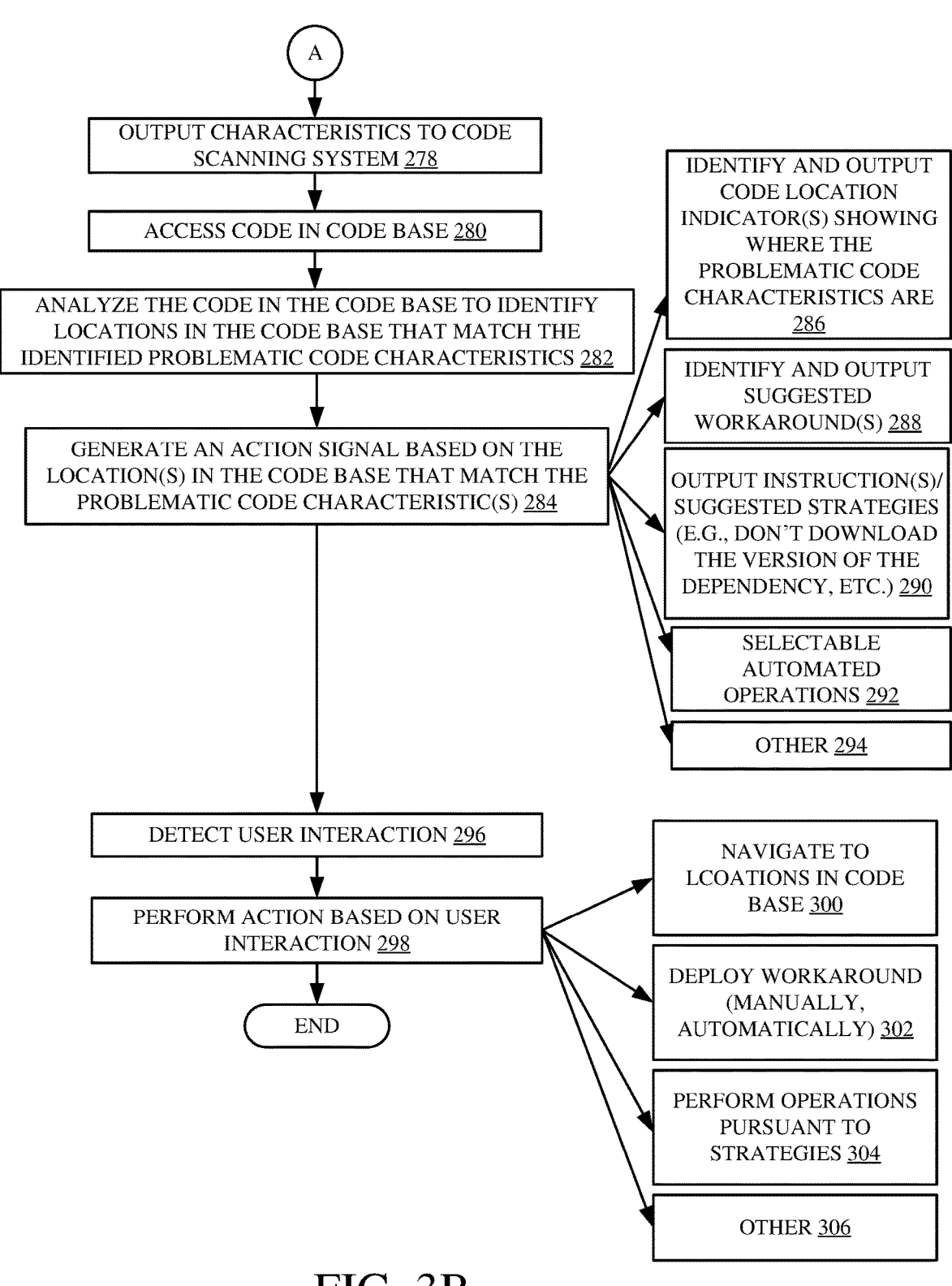

FIGS. 3A and 3B (collectively referred to herein as FIG. 3) show a flow diagram illustrating one example of the operation of scanning system 116 in preemptively identifying portions of code 130 which may manifest an issue in a dependency, and then generate an output so that the issue can be preemptively addressed either automatically, manually, or through a combination of manual and automated operations.

It is first assumed that code 130 in a CI system may incorporate dependencies that have issues, where the issues are tracked by an issue tracking system 140 or another source of information about the issues. It is further assumed that automated issue scanning system 115 is configured to intermittently scan issue sources (such as issue tracking systems 140 or other sources of information about issues) that may correspond to different code dependencies. It will be noted that such systems may incorporate or access AI models 152 to scan for code patterns or problematic code characteristics or to classify issues or information about issues in different ways. The scanning system 116 can be deployed in other ways as well.

Trigger detector 160 then detects a scan trigger indicating that issue scanning system 115 should scan the various sources of information about issues in order to preemptively identify issues that may manifest themselves when running code 130. Detecting a scan trigger is indicated by block 238 in the flow diagram of FIG. 3. Trigger detector 160 may detect a scanning trigger based upon a change in a dependency which is used by code 130. For instance, if the dependency is being upgraded to a new version, or if the dependency has changed in other ways, this may be detected by trigger detector 160, as indicated by block 240 in the flow diagram of FIG. 3. Trigger detector 160 may detect time-based trigger criteria 242 so that issue scanning system 115 intermittently scans the various sources of information (e.g., issue tracking systems 140) intermittently based on time. The issue scanning trigger criteria may be input-based trigger criteria 244 which can include, for instance, user inputs from the various developers indicating that the developers may wish to initiate a scanning operation. The trigger criteria may be operation-based trigger criteria such as trigger criteria indicating that a build operation is performed, as indicated by block 246, or any of a wide variety of other trigger criteria 248. Once triggered, issue source identifier 164 identifies the various sources of information that are to be scanned by system 115. Identifying the sources of information about issues to scan is indicated by block 250 in the flow diagram of FIG. 3. The sources of information about issues may include remote or local issue trackers, as indicated by blocks 252 and 254, or any of a wide variety of other sources of information 256. One example of how issue sources are identified is described in greater detail below with respect to FIG. 4.

Issue scanning system 115 then accesses the sources of information, as indicated by block 258. This may include navigation system 166 navigating to an identified location (URL, web address, etc.) or calling an API 150, or performing other navigation operations, as indicated by block 260. The sources of information can be accessed in other ways as well, as indicated by block 262.

Issue scanner 168 then scans the sources of information to identify characteristics of a code implementation which will likely cause the issue to manifest when that code is run. Such characteristics can be referred to herein as problematic code characteristics. Scanning the issue source to identify such characteristics which will cause an issue to manifest is indicated by block 264 in the flow diagram of FIG. 3.

In one example, data extraction system 182 extracts the issue data from the source of information being scanned, as indicated by block 266. The issue data can include issue descriptions 268, comments in an issue tracking system 270, example workarounds 147, or any of a wide variety of other data or information that can be extracted from a source of information about issues. That information can be scanned using a natural language processor, and/or it can be used to generate a prompt to AI models 152, as indicated by block 272 in the flow diagram of FIG. 3. AI prompt generator 184 can generate such a prompt and prompt response processor 186 can process an AI response from models 152 to identify the problematic code characteristics. The problematic code characteristics can be code patterns 274 or any of a wide variety of other characteristics of code which may cause the issue to manifest, as indicated by block 276. Code characteristic output system 188 then outputs the identified characteristics to code scanning system 117. Outputting the characteristics to code scanning system 117 is indicated by block 278 in the flow diagram of FIG. 3.

Code accessing system 194 then accesses the code 130 that is to be scanned to preemptively identify issues, as indicated by block 280 in the flow diagram of FIG. 3. Problematic code characteristic matching system 196 then attempts to match portions of the code 130 being scanned against the problematic code characteristics which will result in the issue under consideration manifesting when that code is run. Analyzing the code 130 in the code base 128 to identify locations in the code base that match the identified problematic code characteristics is indicated by block 282 in the flow diagram of FIG. 3. For instance, where the problematic code characteristics include code patterns (e.g., positive and/or negative code patterns) which, if present in in code 130, will likely cause the issue to manifest, then those code patterns are matched against code 130 to identify locations in code 130 where the code patterns exist. Where the problematic code characteristics are other characteristics of the code, then those characteristics are matched against the code 130 in code base 128 to determine whether any of those problematic code characteristics exist in code 130.

Scanning system 116 may also maintain one or more caches indicating the results of the most recent times that the issue tracking systems 140 and code 130 have been scanned.

When a problematic code characteristic is matched in code 130, then issue/location list generation system 198 adds the location in code 130 where the problematic code characteristic was matched, along with an identifier for the particular issue which will manifest given the matched characteristic. Suggestion generator 200 can generate suggestions to address the issue and automated operation generator 202 can generate an output indicative of which of those operations can be automatically performed. Cache interaction system 204 also updates code scanning cache 206 with the results of the scanning operation.

The information from issue/location list generation system 198, suggestion generator 200, and automated operation generator 202 can be provided to control signal generator 162 which generates an action signal based upon the locations in the code 130 that match the problematic code characteristics. Generating such an action signal is indicated by block 284 in the flow diagram of FIG. 3. For instance, issue output generator 216 and code location list generator 218 can identify and output code location indicators showing where the problematic code characteristics are in code 130, along with a description or other information related to the issue that is likely to manifest. Identifying and outputting the code location and issue description is indicated by block 286 in the flow diagram of FIG. 3.

Suggested action output generator 220 can also output suggested actions to perform to preemptively address the issue, such as to identify and output suggested workarounds, as indicated by block 288. The suggested operations can include instructions and/or suggested strategies (such as to refrain from downloading a particular version of the dependency, reconfigure the code 130, etc.) as indicated by block 290 in the flow diagram of FIG. 3. Selectable automated operation output generator 222 can generate control signals so that the selectable automated operations can be surfaced for a developer to be automatically performed. Generating an action signal to surface the selectable automated operations is indicated by block 292 in the flow diagram of FIG. 3. A wide variety of other action signals can be generated to perform other actions based on the preemptively identified issues that may manifest in code 130 (or the dependencies relied upon by code 130) as indicated by block 294 in the flow diagram of FIG. 3.

User interface system 114 may then detect user interaction with the outputs that are surfaced for the developer, as indicated by block 296 in FIG. 3. Computing system 106 can then perform actions based upon that detected user interaction, as indicated by block 298. For instance, based on a user input, CI system 112 may navigate the user to the location in the code base 128 where the issue has been preemptively identified, as indicated by block 300. Based on the user interaction, CI system 112 may deploy a suggested workaround 147 either manually or automatically at the identified location, as indicated by block 302. In another example, the user or system 112 may manually or automatically perform the strategies or other suggestions that are surfaced for the developer, as indicated by block 304. The developer or system can perform a wide variety of other actions either manually or automatically in order to preemptively address an issue and prevent or inhibit that issue from manifesting when code 130 is run, as indicated by block 306.

Figure 4:
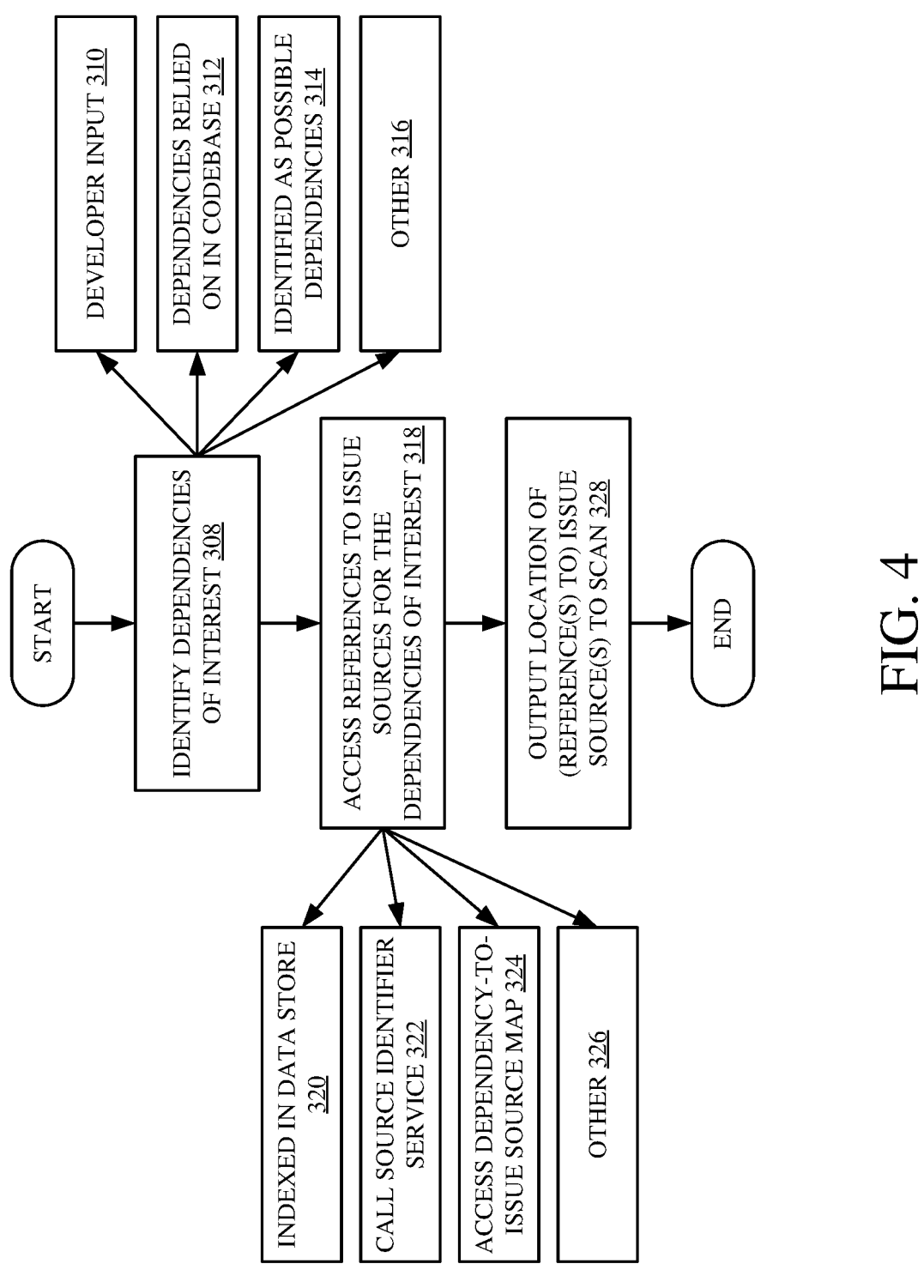
FIG. 4 is a flow diagram illustrating one example of identifying a source of information about an issue.

FIG. 4 is a flow diagram illustrating one example of the operation of issue source identifier 164 in identifying the various sources of information about issues that are to be scanned by issue scanner 168. In one example, dependency-of-interest identification system 124 first identifies one or more dependencies of interest (which may be dependencies that code 130 relies on). Identifying the dependencies of interest is indicated by block 308 in the flow diagram of FIG. 4. The dependencies of interest may be identified based upon a developer input 310 which manually identifies the dependencies of interest. The dependencies of interest may be identified automatically by identifying which dependencies are relied upon by code 130 in code repository 128, as indicated by block 312. The dependencies of interest may be identified in other ways as dependencies that may possibly be relied upon by code 130 (such as a different version of a dependency that is already relied upon by code 130, etc.).

Identifying a dependency of interest as a possible dependency which code 130 may rely upon in the future is indicated by block 314. The dependency of interest can be identified in other ways as well, as indicated by block 316.

Issue source reference accessing system 176 accesses or otherwise identifies references to the issue sources for the dependencies of interest, as indicated by block 318. For instance, each dependency of interest may identify the particular issue tracking systems 140 (or other sources of information about issues) for that dependency. The identified issue sources may have a URL, an API address, a web page address, or another reference which allows the system to access the issue source. The references may be indexed by dependency in a data store, as indicated by block 320, or the references may be obtained by calling a source identifier service 322 where the issue source (e.g., the issue tracking system) has registered. The references that identify the issue sources for a dependency may be maintained in a dependency-to-issue source map which maps the dependencies of interest to the sources of issue information corresponding to those dependencies of interest. Such a map may be maintained by a local or remote service, or such a map may be generated in other ways. Accessing a dependency-to-issue source map to obtain references to the sources of information about issues for a dependency of interest is indicated by block 324 in the flow diagram of FIG. 4. Accessing references to the issue sources for the dependency of interest can be done in any of a wide variety of other ways as well, as indicated by block 326.

Issue reference accessing system 176 then outputs the references identifying the source of information about issues to identifier output system 178. Identifier output system 178 outputs those references to navigation system 166 so that navigation system 166 can navigate the issue source scanner 168 to the various sources of information about issues (e.g., the various issue tracking systems 140) so that those sources of information can be scanned. Outputting the location of the issue sources to scan is indicated by block 328 in the flow diagram of FIG. 4.

It can thus be seen that the present description describes a system in which a scanning system 116 preemptively identifies issues which may manifest in code 130 that is being developed in a continuous integration system. Code dependencies for the code 130 are identified and sources of information about issues in those code dependencies are identified and scanned to determine what code patterns or other characteristics in the code 130 should be identified as possibly causing an issue to manifest in code 130. Code 130 is then scanned to determine whether any of those code patterns or characteristics exist in code 130 and, if so, identify the location of those code patterns or characteristics that information is surfaced, along with suggested operations for preemptively addressing the issue, for a developer. The selected operations can be manually or automatically executed so that the developer can preemptively address issues with dependencies, before code 130 is deployed.

It will be noted that the above discussion has described a variety of different systems, components, engines, generators, detectors, identifiers, and/or logic. It will be appreciated that such systems, components, engines, generators, detectors, identifiers, and/or logic can be comprised of hardware items (such as processors and associated memory, or other processing components, some of which are described below) that perform the functions associated with those systems, components, engines, generators, detectors, identifiers, and/or logic. In addition, the systems, components, engines, generators, detectors, identifiers, and/or logic can be comprised of software that is loaded into a memory and is subsequently executed by a processor or server, or other computing component, engines, generators, detectors, identifiers, as described below. The systems, components, engines, generators, detectors, identifiers, and/or logic can also be comprised of different combinations of hardware, software, firmware, etc., some examples of which are described below. These are only some examples of different structures that can be used to form the systems, components, engines, generators, detectors, identifiers, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
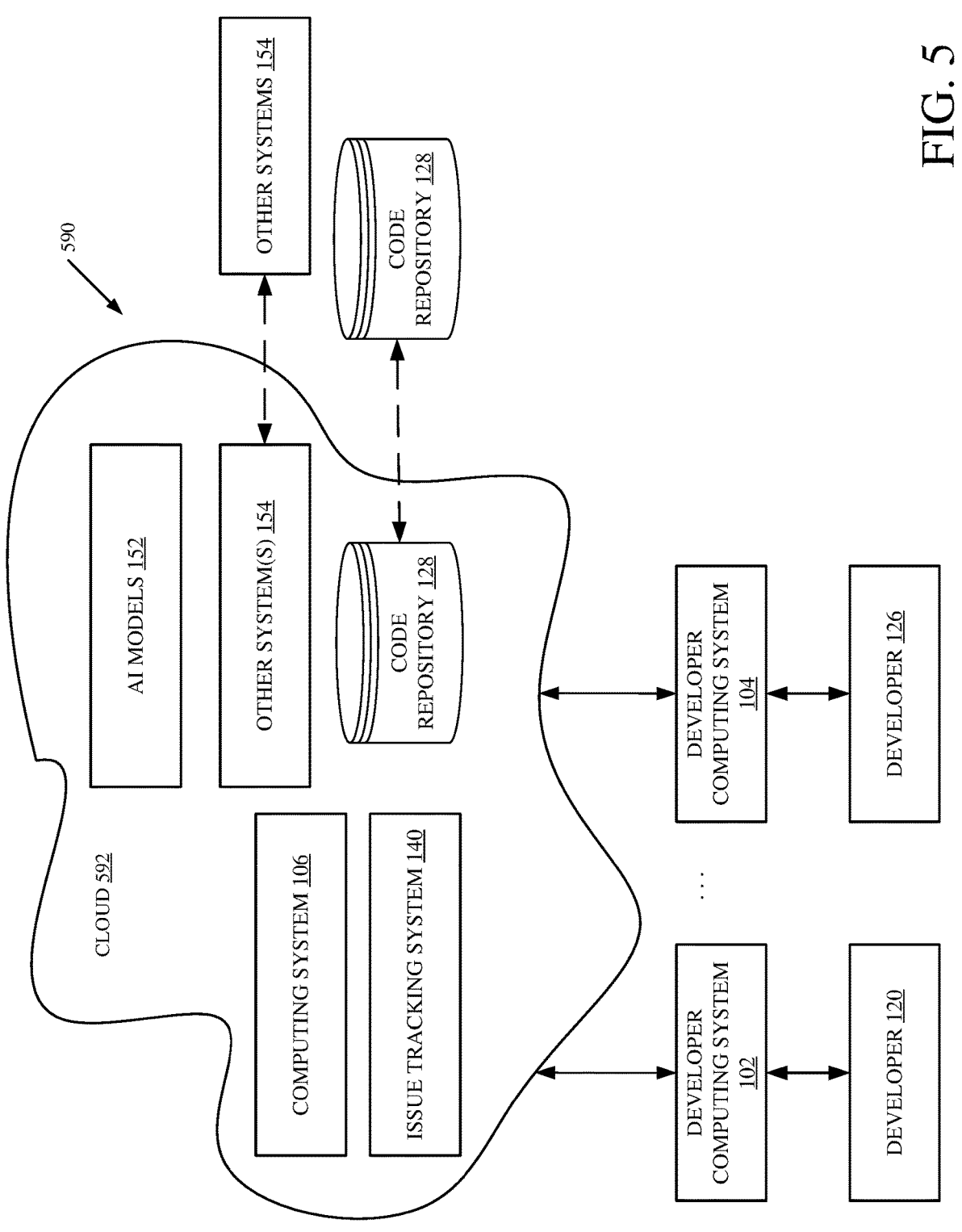
FIG. 5 is a block diagram showing the computing system architecture illustrated in FIG. 1, deployed in a remote server architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 106, issue tracking system 140, AI models 152, other systems 154, and/or code repository 128 can be located in cloud 502 (which can be public, private, or a combination where portions are public while others are private). Therefore, developers 120, 126 use developer systems 102, 104 to access those systems through cloud 502.

FIG. 5 also depicts another example of a cloud architecture. FIG. 5 shows that it is also contemplated that some elements of computing system architecture 100 can be disposed in cloud 502 while others are not. By way of example, code repository 128 and/or other systems 154 or other items can be disposed outside of cloud 502, and accessed through cloud 502. Regardless of where the items are located, the items can be accessed directly by device 504, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
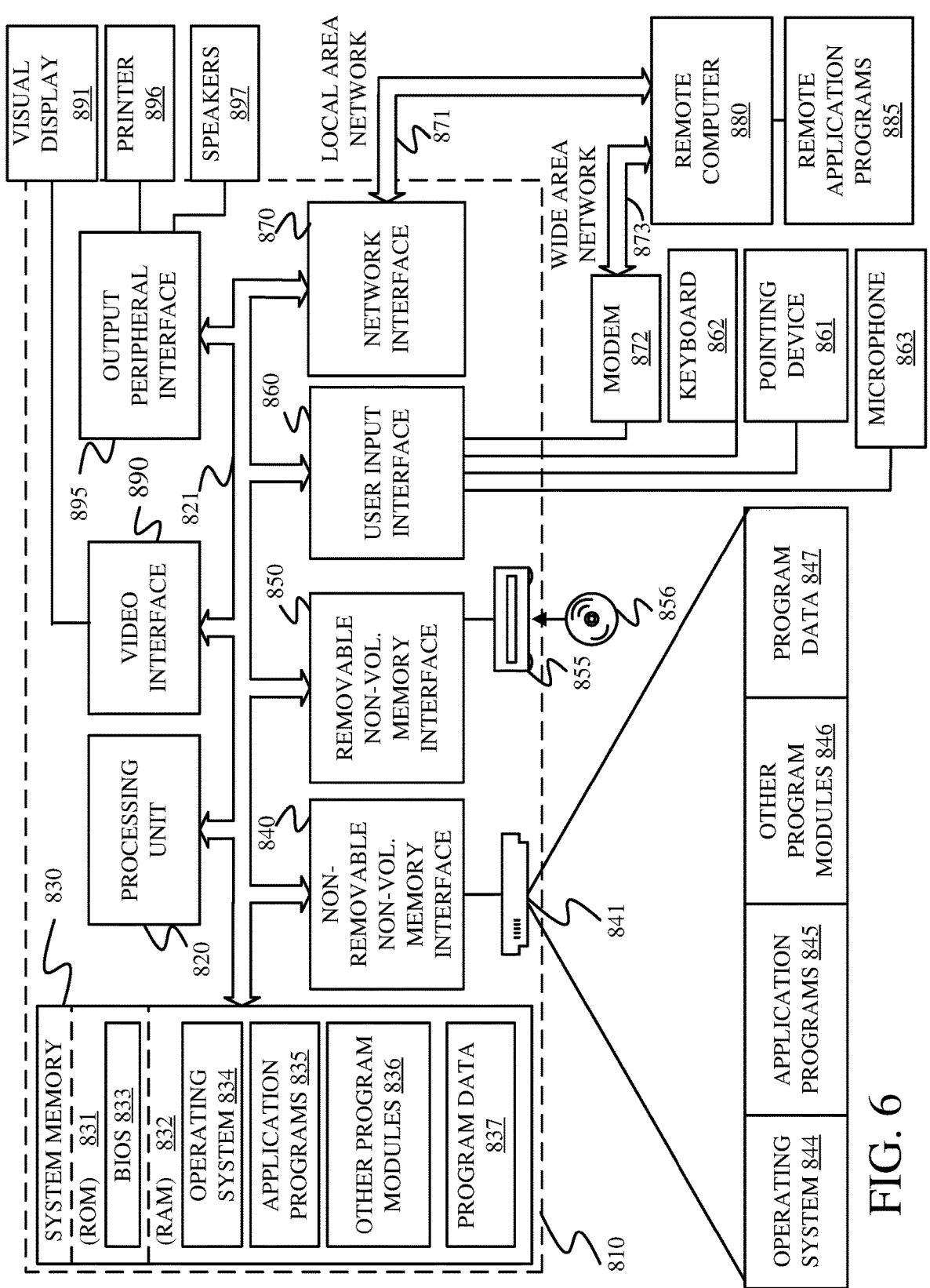
FIG. 6 is a block diagram of one example of a computing environment.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
identifying an issue source that stores information about an issue corresponding to an identified code dependency for code in a code repository;
automatically scanning the information in the issue source to identify:
a problematic code characteristic causing manifestation of the issue when the code in the code repository is executed; and
a presence of:
a positive code pattern indicating a presence of a workaround that is no longer needed in the code, wherein the workaround prevents the code in the code repository from experiencing the issue when the code in the code repository is executed; or
a negative code pattern indicating that the workaround is needed and is not found in the code in the code repository;
matching the problematic code characteristic against the code in the code repository;
automatically identifying a suggested operation to perform on the code in the code repository based on;
the problematic code characteristic in the code in the code repository; and
the presence of the positive code pattern or the negative code pattern; and
generating an action signal to control a user interface system to generate an output indicative of the suggested operation, wherein the suggested operation comprises removing the workaround from the code in the code repository or adding the workaround to the code in the code repository.

2. The computer implemented method of claim 1 wherein automatically scanning the information in the issue source to identify the problematic code characteristic comprises:
generating an artificial intelligence (AI) prompt based on the information in the issue source;
submitting the AI prompt to an AI model;
receiving a response from the AI model; and
identifying the problematic code characteristic based on the response from the AI model.

3. The computer implemented method of claim 1 wherein automatically scanning the information in the issue source to identify the problematic code characteristic comprises:
performing natural language understanding on the information in the issue source to obtain a semantic understanding of the information in the issue source; and
identifying the problematic code characteristic based on the semantic understanding of the issue-related data.

4. The computer implemented method of claim 1 and further comprising:
detecting a scan trigger; and
generating a scan trigger signal, wherein automatically scanning the information in the issue source is performed based on the scan trigger signal.

5. The computer implemented method of claim 4 wherein detecting the scan trigger comprises:
detecting a change in the identified code dependency.

6. The computer implemented method of claim 4 wherein detecting the scan trigger comprises:

detecting an operation-based trigger indicative of an operation performed on the code in the code base.

7. The computer implemented method of claim 1 wherein identifying the issue source comprises:
identifying the code dependency as a dependency of interest; and
accessing a reference to the issue source based on the dependency of interest.

8. The computer implemented method of claim 7 wherein accessing a reference to the issue source comprises:
calling a reference identifier service based on the dependency of interest to obtain the reference to the issue source.

9. The computer implemented method of claim 1 and further comprising:
determining whether the suggested operation is an operation that can be performed in the code repository automatically; and
if so, generating the action signal to control the user interface system to generate the output indicative of the suggested operation with a selection actuator that is actuatable by a user to automatically perform the suggested operation.

10. The computer implemented method of claim 1 wherein matching the problematic code characteristic against the code in the code repository comprises:
detecting a location in the code in the code repository where the problematic code characteristic is located, and wherein generating the action signal comprises controlling the user interface system to generate the output to indicate the location in the code where the problematic code characteristic is detected.

11. A computer system, comprising:
an issue source identifier configured to identify an issue source that stores information about an issue corresponding to an identified code dependency for code in a code repository;
an issue source scanner configured to automatically scan the information in the issue source to identify:
a problematic code characteristic causing manifestation of the issue when the code in the code repository is executed; and
a presence of:
a positive code pattern indicating a presence of a workaround that is no longer needed in the code, wherein the workaround prevents the code in the code repository from experiencing the issue when the code in the code repository is executed; or
a negative code pattern indicating that the workaround is needed and is not found in the code in the code repository;
a matching system configured to match the problematic code characteristic against the code in the code repository;
a suggestion generator configured to automatically identify a suggested operation to perform on the code in the code repository based on;
the problematic code characteristic in the code in the code repository; and
the presence of the positive code pattern or the negative code pattern;
a control signal generator configured to generate an action signal based on the suggested operation, wherein the suggested operation comprises removing the workaround from the code in the code repository or adding the workaround to the code in the code repository; and

a user interface system configured to generate an output indicative of the suggested operation.

12. The computer system of claim 11 wherein the issue source scanner comprises:
an artificial intelligence (AI) prompt generator configured to generate an AI prompt based on the information in the issue source and to submit the AI prompt to an AI model; and
a response processor configured to receive a response from the AI model and identify the problematic code characteristic based on the response from the AI model.

13. The computer system of claim 11 and further comprising:
a trigger detector configured to detect a scan trigger and generate a scan trigger signal, wherein the issue source scanner is configured to automatically scan the information in the issue source based on the scan trigger signal.

14. The computer system of claim 13 wherein the trigger detector is configured to detect, as the scan trigger, a change in the identified code dependency.

15. The computer system of claim 13 wherein the trigger detector is configured to detect, as the scan trigger an operation-based trigger indicative of an operation performed on the code in the code base.

16. The computer system of claim 11 wherein the issue source identifier comprises:
a dependency of interest identification system configured to identify the code dependency as a dependency of interest; and
an issue source reference accessing system configured to access a reference to the issue source based on the dependency of interest.

17. The computer system of claim 11 wherein the suggestion generator comprises:
an automated operation generator configured to determine that the suggested operation is an operation that can be performed in the code repository automatically and wherein the control signal generator is configured to generate the action signal to control the user interface system to generate the output indicative of the suggested operation with a selection actuator that is actuatable by a user to automatically perform the suggested operation.

18. A computer system, comprising:
at least one processor; and
a memory storing computer executable instructions which, when executed by the at least one processor, cause the at least one processor to perform steps, comprising:

identifying an issue source that stores information about an issue corresponding to an identified code dependency for code in a code repository;
automatically generating a first artificial intelligence (AI) prompt based on the information in the issue source;
submitting the first AI prompt to an AI model;
receiving a response from the AI model;
identifying a problematic code characteristic based on the response from the AI model, the problematic code characteristic causing manifestation of the issue when the code in the code repository is executed, wherein the problematic code characteristic is one of:
a positive code pattern indicating a presence of a workaround that is no longer needed in the code, wherein the workaround prevents the code in the code repository from experiencing the issue when the code in the code repository is executed; or
a negative code pattern indicating that the workaround is needed and is not found in the code in the code repository;
matching the problematic code characteristic against the code in the code repository;
automatically identifying a suggested operation to perform on the code in the code repository based on:
the problematic code characteristic in the code in the code repository; and
the presence of the positive code pattern or the negative code pattern; and
generating an action signal to control a user interface system to generate an output indicative of the suggested operation, wherein the suggested operation comprises removing the workaround from the code in the code repository or adding the workaround to the code in the code repository.

19. The computer system of claim 18 wherein identifying the issue source comprises:
identifying the code dependency as a dependency of interest; and
accessing a reference to the issue source based on the dependency of interest.

20. The computer system of claim 18 wherein accessing the reference to the issue source comprises:
calling a reference identifier service based on the dependency of interest to obtain the reference to the issue source.

* * * * *